June 19, 1945. G. W. WATTS 2,378,607
MEANS FOR HANDLING POWDERED SOLIDS
Filed July 3, 1941 2 Sheets-Sheet 2
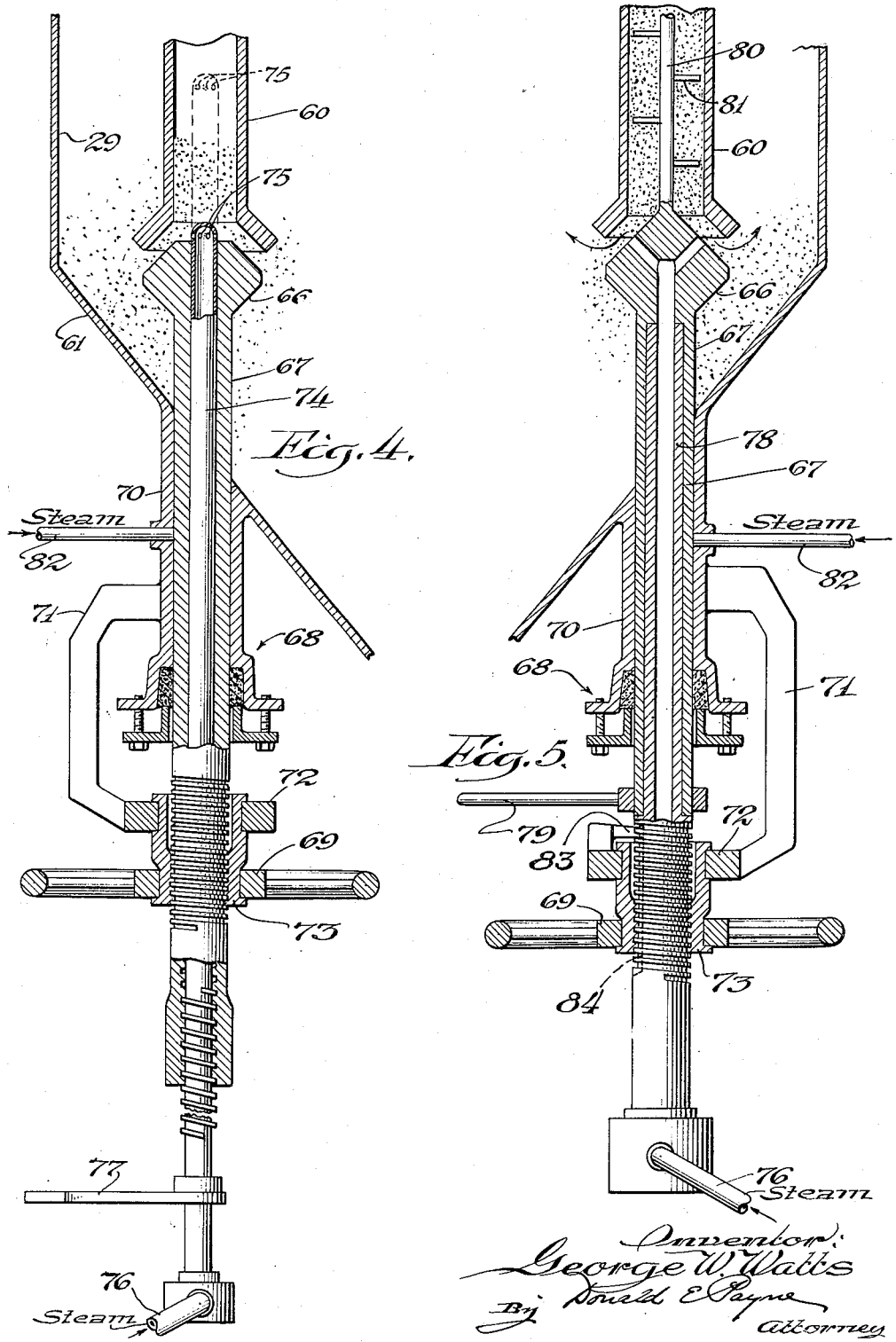

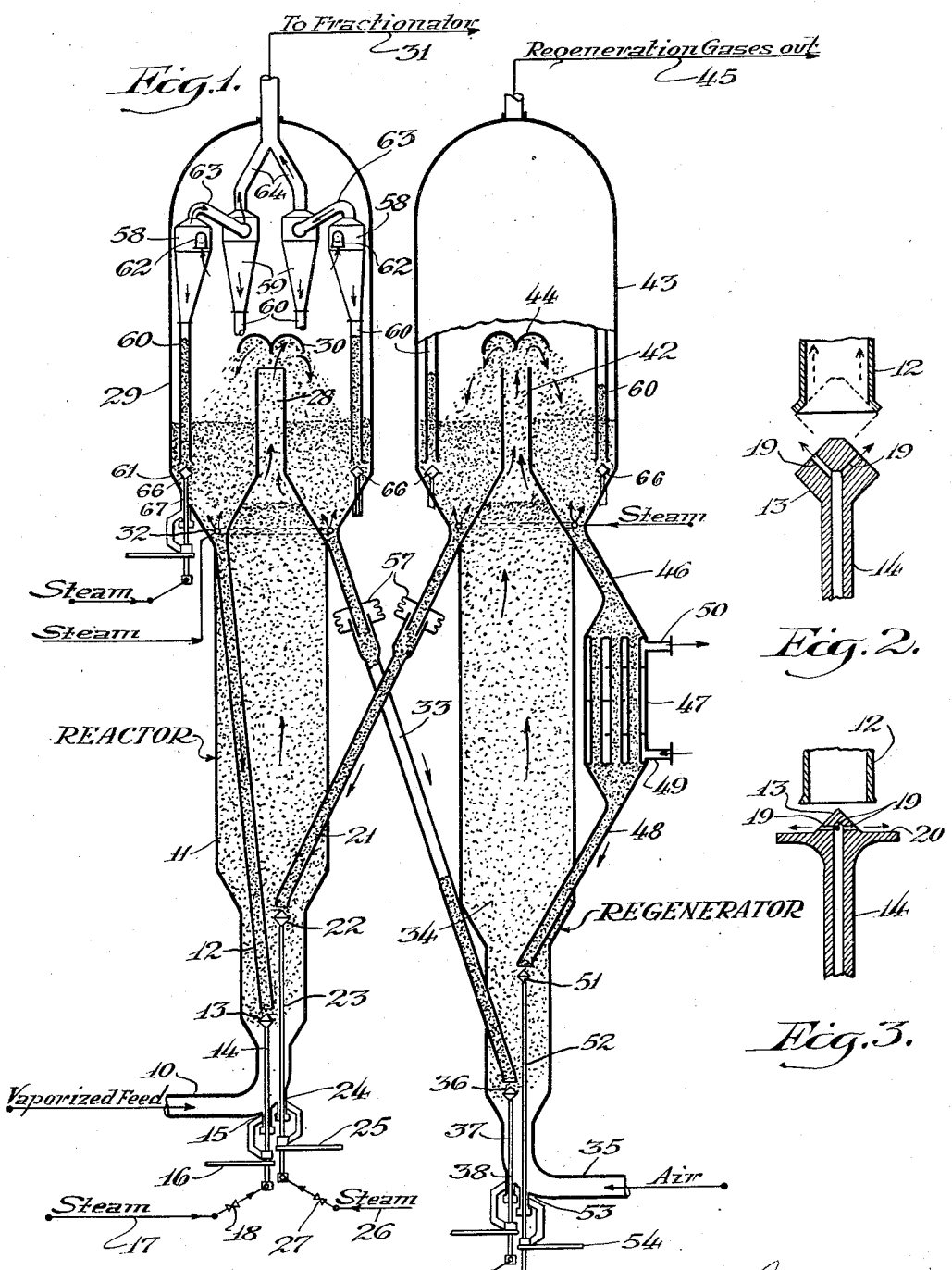

Patented June 19, 1945

2,378,607

UNITED STATES PATENT OFFICE 2,378,607

MEANS FOR HANDLING POWDERED SOLIDS

George W. Watts, Flossmoor, Ill., assignor to Standard Oil Company, Chicago, Ill., a corporation of Indiana Application July 3, 1941, Serial No. 400,951

14 Claims. (Cl. 23—288)

This invention relates to means for handling powdered solids and it pertains more particularly to improved means for maintaining powdered solids in fluent form and for regulating the downward flow of powdered solids in standpipes, cyclone-separator dip legs, etc.

The invention is particularly applicable to a powdered or fluid-type catalyst system wherein a powdered catalyst effects conversion while suspended in reaction gases or vapors. The catalyst may then be separated from reaction products and suspended in a gas mixture for regeneration, in which case the regenerated catalyst must be separated from regeneration gases before it is returned for resuspension in reaction gases or vapors. In such systems the powdered catalyst may be pneumatically conveyed to high levels and it may flow through standpipes, dip legs or other conduits from high levels to low levels. If there is any interruption in this downward flow of separated solids there is a tendency for the solids to bridge and thereby cause a plugging of the conduit. An object of my invention is to provide means for preventing such catalyst bridging or plugging.

When powdered solids flow downwardly in a conduit and have to be passed around bends in said conduit the problem of plugging becomes more aggravated. Furthermore such pipe bends are subject to severe erosion. An object of my invention is to avoid such pipe bends insofar as this is possible and to provide a system wherein the powdered solids flow downwardly in substantially straight vertical conduits. A further object is to minimize expansion difficulties, particularly during those periods when a powdered catalyst system is being started up or shut down. A further object is to shorten the pipes and conduits required for handling powdered catalyst in a hydrocarbon conversion system and to shorten the structure for supporting such a conversion system. A further object is to avoid the use of the 180 degree bends that have heretofore been used at the base of standpipes for returning aerated catalyst to a reactor or regenerator chamber.

In order that powdered solids may be handled as a fluid it is essential that such solids be either subjected to mechanical stirring or to aeration, particularly during periods of interrupted flow. Powdered solids may flow downwardly as a fluid in a standpipe when there are no restrictions or bends in the pipe provided the flow is uninterrupted but when such flow is momentarily stopped there is a tendency for the solids to bridge and cause tube plugging. An object of my invention is to provide means whereby the solids in the standpipe may be aerated when the flow therein is momentarily stopped.

A further object is to provide improved means for dispersing solids discharged from the lower end of a substantially straight tube into a hopper, reactor or regenerator in which the lower end of the tube terminates. A further object is to provide a new and improved combination of tube closure and agitating or cleaning means in combination with a substantially vertical tube for handling powdered solids. Other objects will be apparent as the detailed description of the invention proceeds.

An important feature of my invention is the provision, at the open downwardly-extending end of a standpipe in a reactor, regenerator or hopper, of an externally operated standpipe closure which is provided with a hollow stem so that steam or other inert gas may be introduced through this closure to effect aeration when little or no catalyst is being dispersed therefrom, and so that said steam or inert gas may be used for dispersing catalyst from the base of the standpipe into the reactor or regenerator when substantial amounts of catalyst are flowing from the base of the standpipe into said reactor or regenerator.

My improved closure may be of various shapes and designs. It may be provided with a conical tip which will insure centering and with laterally directed orifices or nozzles communicating with the hollow stem so that the steam or other gases which are introduced through the hollow stem will disperse catalyst into the chamber during the flow of substantial amounts of catalyst and will aerate catalyst in the standpipe during periods of little or no catalyst flow. A vertically movable steam pipe with outwardly directed orifices at its upper end may be slidably mounted within the hollow stem. Mechanically operated stirrers may be secured to and operated by movement of the valve closure.

Another feature of my invention is the provision of means for preventing the plugging of cyclone separator dip legs which extend below the surface of settled solids in a catalyst separation chamber. Variations in pressure or in the level of settled solids in said chamber may cause the plugging of solids in the cyclone dip legs unless these dip legs are provided with mechanical stirring or aeration means. I have provided improved closures for said dip legs which may regulate the flow of solids therefrom and I have combined these closures with a means for maintaining the catalyst in fluent form in the dip legs. The means for dispersing solids from these dip legs into the settled catalyst in the hopper may also serve for aerating the settled solids in the hopper.

The invention will be more clearly understood from the following detailed description and from the accompanying drawings which form a part of the specification and in which Figure 1 is a schematic flow diagram of a catalytic cracking and catalyst regeneration system illustrating the application of my invention;

Figure 2 is a detail section of one embodiment of a valve closure;

Figure 3 is a detail section of another embodiment of a valve closure;

Figure 4 is a detail vertical section of a standpipe closure, aerator, and cleaning means; and Figure 5 is an embodiment of a standpipe closure, aerator, and mechanical stirring means.

While the invention is applicable to a wide variety of catalytic conversion systems it is primarily designed for hydrocarbon conversion processes such as isomerization, desulfurization, polymerization, reforming, isoforming, alkylation, gas reversion, hydrogenation, dehydrogenation, etc. and it is particularly applicable to the catalytic cracking of gas oils and heavier hydrocarbons. The charging stock may consist of or may contain hydrocarbons produced by other conversion processes such as cracking or coking, hydrocarbons synthetically produced by the hydrogenation of carbonaceous materials, or hydrocarbons produced by a carbon monoxide hydrogen synthesis. In my preferred embodiment I will describe the invention as applied to the catalytic cracking of Mid-Continent gas oil.

The gas oil feed stock is vaporized and heated in conventional heat exchangers in pipe still coils to a temperature of about 800 to 1000° F. for example about 900° F., and is introduced at a pressure of about atmospheric to 50 pounds per square inch, for example about 15 pounds per square inch, through transfer line 10 to the bottom of reactor 11. Various amounts of steam may be included with the hot vapors so introduced.

When it is desired to subject these vapors to partially spent catalyst before they are contacted with fresh catalyst such partially spent catalyst may be dispersed into the vaporized hydrocarbons from the bottom of standpipe 12. The amount of catalyst so introduced may be controlled by raising or lowering closure member 13 which is supported by hollow shaft 14 extending through packing gland 15 and externally raised or lowered by means of valve handle 16 or by any other manually or automatically operated mechanism known to those skilled in the art. Steam or other inert gas is introduced into the hollow stem 14 through line 17 in amounts controlled by valve 18. The hollow stem terminates in laterally directed ports or nozzles 19 (see Figure 2) the gas jets from which disperse catalyst flowing from the base of standpipe 12 into the upflowing hot vapors. The catalyst from standpipe 12 is thus prevented from entering the reactor as a slug and is uniformly dispersed in the upflowing hydrocarbon vapors and carried thereby into the upper part of the reactor.

When it is unnecessary or undesirable to contact the incoming vapors with partially spent catalyst closure member 13 may be moved to its upper position. In this position the flow of catalyst through standpipe 12 is stopped and the catalyst is maintained in fluent or liquid-like condition in the standpipe by means of aeration gas which is introduced through inclined ports 19 adjacent the periphery of the standpipe. For aeration the vertical velocity of the steam or aerating gas in the standpipe should usually be about .05 to about .5 foot per second but this will, of course, depend upon the nature of the catalyst, its fineness, density, etc.

The conical closure is self-centering and the hollow stem 14 is sufficiently flexible to permit a fairly tight seal regardless of any slight movement at the base of standpipe 12 or any slight movement of closure member 13 while it is in the open position.

Various modifications in the size and shape of the closure member may be made without departing from my invention. For example, I may employ a substantially flat closure 20 as shown in Figure 3 and the lateral ports 19 may be so directed as to sweep this surface free of catalyst so that when the closure approaches the end of standpipe 12 a cleaner and tighter seal may be obtained than would otherwise be possible. The valve seats may be so positioned as to prevent any scouring or erosion thereof, the lower seat being protected by the aerating gas screen and the upper being out of the direct path of catalyst flow.

Fresh or regenerated catalyst may be introduced into the reactor through standpipe 21 in amounts regulated by pipe closure 22 which is supported by hollow stem 23 extending through packing gland 24 and externally operated by a manual or automatic control mechanism 25. Steam is introduced to hollow shaft 23 through line 26 in amounts regulated by valve 27.

The reactor 11 should be of such size and shape as to effect contact of the vapors with the necessary amount of catalyst and for the necessary amount of time. In this case the catalyst is preferably of the silica-alumina or silica-magnesia type and it may be prepared by the acid treating of natural clays such as bentonite or by synthetically preparing a powdered silica-alumina or silica-magnesia mixture. Such a mixture may be prepared by ball-milling silica hydrogel with alumina or magnesia, drying the resulting dough at a temperature of about 240° F. and then activating by heating to a temperature of about 900 to 1000° F. The catalyst per se forms no part of the present invention and it is, therefore, unnecessary to describe it in further detail.

With catalyst in powdered form, having a particle size of about 10 to 100 microns, I prefer to employ vapor velocities in the reactor of about .4 to 4 feet per second, for example about 1½ or 2 feet per second in the reactor. The catalyst-to-oil weight ratio may be about 1:1 to about 8:1 and is preferably about 4:1. The catalyst residence time may range from a few seconds to an hour or more but is preferably about 5 to 10 minutes. The vapor residence time is usually about 10 to 30 seconds. The catalyst introduced through line 21 is preferably at a temperature of about 900 to 1000° F., for example about 950° F., and the temperature prevailing throughout the reactor may thus be maintained at about 900 to 925° F.

Reaction products and suspended catalyst pass from the top of the reactor through pipe 28 into enlarged settling chamber 29 which may be provided with a baffle 30 for distributing the suspended catalyst stream uniformly in the settling chamber thus preventing a chimneying effect. Cyclone separators may be employed in the top of the settling chamber for removing catalyst which has failed to separate out in the separating chamber. The products which are thus substantially freed from catalyst are withdrawn through line 31 to a product fractionation system (not shown) wherein a gas fraction, a gasoline fraction and one or more gas oil fractions are separated from each other by any conventional means known to the art. Any remaining traces of catalyst may be recycled with the heaviest fraction back to the initial heating step with fresh feed.

The settled catalyst in chamber 29 is maintained in fluent condition by the introduction of an aerating gas such as stem through distributing means 32, the steam serving to strip the hydrocarbon vapors from the catalyst as well as mixing the catalyst and maintaining it in fluent form. A part of this settled catalyst may be returned by standpipe 12 to the base of the reactor as hereinabove described.

Settled catalyst from the settling chamber is withdrawn through standpipe 33 to the lower part of regenerator tower 34 into the base of which air is introduced through line 35. The rate at which spent catalyst is thus introduced into the regenerator is controlled by closure member 36 which is carried by hollow stem 37 extending through packing gland 38 to external operating means. Steam is introduced into the hollow stem through line 40 in amounts controlled by valve 41 and this steam disperses the catalyst into the incoming air in the manner hereinabove described.

The gas velocities in the regenerator may be substantially the same as in the reactor and sufficient time is allowed in the regenerator to permit the combustion of carbonaceous material from the catalyst. Regenerated catalyst is carried from the top of the regenerator by the regeneration gases through pipe 42 into enlarged settling chamber 43 and the gases are distributed in this settling chamber by means of baffle 44. Here again cyclone separators may be employed for removing further amounts of regenerated catalyst from regeneration gases and the final residue of catalyst may be separated from said gases in an electrostatic precipitator. The hot regeneration gases may be withdrawn through line 45 and employed for generating steam, for driving a turbine or for any other industrial purposes.

It is essential to keep the temperature in the regenerator within safe limits and when large amounts of carbonaceous material are deposited on the catalyst it is necessary to abstract heat from this part of the system. This heat extraction may be effected by recycling a substantial part of settled catalyst from chamber 43 through line 46, heat exchanger 47 and pipe 48 back to the regenerator tower 34. I prefer to pass the catalyst through tubes in this heat exchanger and to introduce a cooling fluid around the tubes through line 49 to withdraw said fluid through line 50.

The amount of catalyst recycled through the heat exchanger may be regulated by the position of closure member 51 which is supported by hollow stem 52 extending through packing gland 53 to externally operated control means 54. Steam is introduced into the hollow stem through line 55 in amounts regulated by valve 56.

The temperature of the recycled catalyst may be controlled by regulating the amount and temperature of the cooling fluid or by regulating the amount of recycled catalyst, or both. I prefer to introduce the recycled catalyst at a higher point in the regenerator than the point at which spent catalyst is introduced thereto. The spent catalyst may be introduced at a temperature of about 900° F. and the regenerated catalyst at a temperature about 850° F. but it will be understood that these temperatures may be varied within wide limits.

Since the reactor 11 may be about 25 feet or more in height and the regenerator may be even higher, it is obvious that provision must be made to take care of differential expansion during the starting up or shutting down of the system. This problem is greatly simplified by the use of the relatively short substantially straight standpipes which may be employed with my improved standpipe closure and aerating means hereinabove described. Simple expansion joints 57 are provided in standpipes 21 and 33.

As above stated, cyclone separators may be employed in settling chambers 29 and 43 for removing residual catalyst particles from the gases which are discharged therefrom through lines 31 and 45 respectively. These cyclones are preferably mounted inside the chamber and around the periphery thereof and may be connected in series or in parallel or both in series and in parallel. I have illustrated primary cyclines 58 and secondary cyclones 59, but any number of stages may be used. All of these cyclones are provided with dip legs 60 which may be either concentrically or eccentrically mounted in order that they may be positioned adjacent the outer chamber walls and may extend vertically to a point adjacent the outwardly extending chamber bottom 61. Gases from the upper part of the chamber are introduced through openings 62 into the primary cyclones. Gases are conducted from the primary to the secondary cyclones through lines 63 and gases are removed from the secondary cyclones through lines 64 to line 31.

With a pressure of about 8 pounds in the settling chamber, the pressure in the primary cyclones may be about 7½ pounds and in secondary cyclones may be about 7 pounds, this difference in pressure being balanced by the head of separated catalyst in the respective dip legs 60. If for any reason there is a surge in pressure in chamber 29 or an increase in the height of the level of settled catalyst therein, the downward flow of catalyst in dip legs 60 may temporarily cease and thus permit compacting and bridging of catalyst in these dip legs. When the dip legs become plugged with deposited solids in this manner the cyclones are rendered inoperative and a feature of my invention is the provision of means for preventing the plugging of these dip legs and for cleaning the dip legs if they do become plugged.

Catalyst dip legs 60 are in fact small standpipes and I may provide closures for the bottom of these standpipes similar to the standpipe closures already described. Beneath each dip leg I may provide a closure member 66 which is mounted on a hollow stem 67 extending through a stuffing box 68 to external control means 69. In Figure 4 I have illustrated an arrangement in which the hollow stem 67 is slidably mounted in conduit 70 which carries a yoke 71 with a bearing 72 in the lower arm thereof. In this bearing a threaded member 73 may be rotated by wheel or lever 69 for moving closure 66 toward and away from the lower end of dip leg 60. In this particular modification a separate steam pipe 74 is slidably mounted in the hollow valve stem and provided with laterally directed ports 75 at its upper end. The lower end of this pipe is connected to steam line 76 so that the steam introduced in regulated amounts through line 76 is discharged through ports 75 for discharging catalyst from the base of the dip legs when the ports are in the position shown by the solid lines in Figure 4.

By means of handle 77 (or by any other suitable means) tube 74 may be raised or lowered without changing the position of closure member 66. Thus if there should be any plugging or accumulations of solids in standpipe or dip leg 60 the inner pipe 74 may be advanced throughout the entire length of the dip leg and any accumulated catalyst particles may be blasted from the inner walls of the dip legs by steam from ports 75. Thus steam from these ports may serve three distinct functions: (1) it may serve to effect aeration in the standpipe, (2) it may serve to discharge catalyst from the base of the standpipe, and (3) it may serve to scour the standpipe and free it from any deposits of catalyst particles.

In Figure 5 I have shown another modification of my invention wherein closure member 66 is supported by hollow stem 67 but is rotatably mounted around an inner pipe 78. In this case it is the inner pipe which is raised or lowered by valve closure means 69 and the valve closure itself may be rotated by means of a suitable wheel or handle 79. The aeration ports in this case may be provided in the valve closure as illustrated in Figure 2. Secured to the top of the valve closure in this modification is a rod 80 with stirring vanes 81 secured thereto, thus a stirrer is provided for the catalyst in standpipe 60 which can be used for dislodging any bridged catalyst material and for maintaining the catalyst in fluent form in tube 60. This stirrer may be moved vertically to an extent sufficient to permit vanes 81 to traverse the entire space within the tube and by rotating or raising and lowering this stirrer or by simultaneously rotating and moving the stirrer in a vertical plane I may maintain the desired operation of the standpipe without any interruption. Steam may be introduced through line 82 in amounts sufficient to prevent any catalyst particles from entering the space between tubular members 67 and 70.

In Figure 5 rotation of the center pipe 78 is prevented by key 83 sliding in slot 84 while the outer tubular member 67 may be rotated by means of handle 79. Instead of using this construction I may provide stirring means mounted on a centrally movable rod or tube and I may rotate or reciprocate such centrally mounted rod or tube inside the hollow stem of the closure support in order to maintain the catalyst in fluent form. While I have illustrated certain examples of pneumatic and mechanical devices for maintaining solids in a fluent condition in vertical standpipes it should be understood that my invention is not limited to any of these particular examples since various other modifications of the invention will be apparent to those skilled in the art from the above description. The invention is not limited to the conical upper surface of the valve for positioning or centering the valve and it should be understood that a suitable yoke or guide means may be secured to the lower part of any standpipe for maintaining the closure member in alignment with the open end of the standpipe. Instead of introducing steam below the valve operating means I may provide a steam jacket around the valve stem below stuffing box 68 and above the handle or valve regulating means. The aeration gas or steam line may be connected directly to this steam jacket, the upper and lower ends of the steam jacket may be closed by suitable stuffing boxes in order to permit rotation and vertical movement of the hollow valve stem therein, and one or more holes may be drilled in that portion of the valve stem which is within the steam jacket to provide communication between the steam jacket and the hollow interior of the valve stem. These and equivalent structures are all included within the scope of my invention.

The hollow valve stem, particularly of the type illustrated in Figure 4, provides access for the introduction of boring tools or plungers for cleaning the dip leg or standpipe. It will be seen that tubular member 74 may be completely withdrawn from hollow stem 67 and that any suitable reamer, scraper or other tool may be inserted through hollow valve stem 67. The tool may contain means for aerating as well as for boring the dip leg.

I claim:

1. In a system for handling powdered solids, a chamber for contacting suspended solids with gases or vapors, a conduit extending downwardly into said chamber, means for introducing powdered solids into the conduit at its upper end and for maintaining a pressure head at its lower end greater than the pressure in the chamber at the lower end of the conduit a closure for said conduit, a hollow stem supporting said closure and extending to a point outside of said chamber, means outside of said chamber for moving said closure with respect to the end of said conduit, said closure having an orifice communicating with the opening in said hollow stem and means for introducing a gas through said hollow stem and said orifice for aerating powdered material in said conduit when said closure is in closed position.

2. The system defined by claim 1 wherein the orifice is laterally inclined and whereby solids are dispersed from said conduit into said chamber when said closure is in open position.

3. The system of claim 1 wherein said closure is provided with a conical portion for centering said closure with respect to said conduit.

4. In a fluid-type catalyst system of the type wherein powdered catalyst effects conversion while suspended in hydrocarbon vapors in a conversion reactor, is then separated from the hydrocarbon vapors and suspended in a gas for regeneration in a regenerator reactor and is finally separated from regeneration gas and returned for further conversion, the apparatus which comprises a large vertical reactor, a conduit extending downwardly in said reactor, a closure for said conduit inside of said reactor, a hollow stem for said closure extending to a point outside of said reactor, means outside of said reactor for controlling the position of said closure, at least one orifice in said closure communicating with said hollow stem and means for introducing steam through said hollow stem for aerating catalyst in said conduit when the closure is in closed position and for dispersing catalyst in said reactor when the closure is in open position.

5. In a system for handling finely divided solids, a large chamber, a substantially vertical standpipe extending downwardly in said chamber, a closure member mounted beneath said standpipe on a hollow stem extending through said chamber wall, means outside of said chamber for regulating the position of said closure member, means for introducing an aerating fluid through said hollow stem and means supported by said hollow stem for dislodging deposited solids from said standpipes.

6. The apparatus of claim 5 wherein the means for dislodging solid particles comprises a tube slidably mounted within said hollow stem, said tube being closed at its upper end and being provided with outwardly directed ports for directing a fluid against the standpipe walls when the pipe is raised or lowered.

7. The apparatus of claim 5 wherein means for removing deposited solids comprises a mechanical stirrer secured to the closure member.

8. In apparatus for removing finely divided solids from gases an enlarged separating chamber having outwardly extending bottom wall, means for retaining a layer of separated solids in the lower part of said chamber, a cyclone separator mounted at the periphery of said chamber, a dip leg extended from said cyclone separator to a point beneath the layer of separated solids in said chamber and above the outwardly extending bottom wall, a closure member mounted underneath the end of said dip leg and supported by a hollow stem extending through said outwardly extending bottom wall, means outside of said chamber for regulating the position of said closure member and means carried by said hollow stem for dislodging solid deposits in said dip leg.

9. In catalytic conversion apparatus a chamber for containing powdered catalyst, a substantially vertical standpipe in said chamber for introducing powdered catalyst thereto, a closure member for the bottom of said standpipe, a hollow support for said closure member extending through the chamber wall, means outside of the chamber wall for raising and lowering said closure member toward and away from the lower end of the standpipe, means for introducing an aerating gas through said hollow support and said closure member into downwardly flowing catalyst powder, and means for centering said closure member with respect to the lower end of the standpipe.

10. The apparatus of claim 9 which includes means for introducing a cleaning tool through said hollow supporting member and into said standpipe.

11. The apparatus of claim 9 which includes means for introducing a cleaning tool through said hollow supporting member into said standpipe and means for introducing a gas into said standpipe through said tool.

12. In catalytic conversion apparatus a vertical reaction chamber, an enlarged catalyst separation chamber above said reaction chamber with a laterally inclined wall connecting the separation chamber to the reaction chamber, a cyclone separator mounted in said separation chamber at the periphery thereof and provided with a downwardly extending dip leg terminating above the outwardly extending wall, a closure member for the bottom of said dip leg, a hollow support for said closure member extending downwardly through a stuffing box in said wall, means outside of said chambers for controlling the position of said closure member and means for introducing an aerating gas through the hollow stem and through the closure member.

13. In catalytic conversion apparatus a chamber for containing powdered catalyst, a substantially vertical standpipe in said chamber, means for causing a column of powdered catalyst to flow downwardly in said standpipe, a closure member at the bottom of said standpipe, a hollow support for said closure member extending through the chamber wall, means outside of the chamber wall for raising and lowering said closure member toward and away from the lower end of the standpipe and means for directing gases from the hollow support through the upper part of the closure member while said member is in closed position.

14. The apparatus of claim 13 wherein the closure consists of a central conical surface and a lateral valve seating surface.

GEORGE W. WATTS.